United States Patent
Peng et al.

(10) Patent No.: US 7,467,802 B2
(45) Date of Patent: Dec. 23, 2008

(54) STRUCTURE FOR ENABLING INDEPENDENTLY SUSPENDED WHEELS TO LEAN WITH VEHICLE HULL

(75) Inventors: Yu-Yin Peng, Hsinchu (TW); Wen-Shu Jiaung, Toufen Town (TW); Cheng-Ho Li, Zhonghe (TW)

(73) Assignee: Industrial Technology Research Institute, Hsinchu (TW)

( * ) Notice: Subject to any disclaimer, the term of this patent is extended or adjusted under 35 U.S.C. 154(b) by 309 days.

(21) Appl. No.: 11/491,078

(22) Filed: Jul. 24, 2006

(65) Prior Publication Data

US 2007/0126199 A1 Jun. 7, 2007

(30) Foreign Application Priority Data

Dec. 1, 2005 (TW) ............................. 94142304 A

(51) Int. Cl.
*B60G 21/05* (2006.01)
*B62D 9/02* (2006.01)

(52) U.S. Cl. .......................... 280/124.103; 280/124.11; 280/124.111

(58) Field of Classification Search .......... 280/124.103, 280/124.111, 124.113, 47.131; 180/210
See application file for complete search history.

(56) References Cited

U.S. PATENT DOCUMENTS

| | | | | |
|---|---|---|---|---|
| 2,150,199 | A * | 3/1939 | Weston | 280/124.103 |
| 2,961,254 | A | 11/1960 | Muller | |
| 4,088,199 | A * | 5/1978 | Trautwein | 180/209 |
| 4,159,128 | A | 6/1979 | Blaine | |
| 4,360,224 | A * | 11/1982 | Sato et al. | 280/269 |
| 4,484,648 | A * | 11/1984 | Jephcott | 180/210 |

(Continued)

FOREIGN PATENT DOCUMENTS

DE 4135585 A1 5/1993

(Continued)

*Primary Examiner*—Eric Culbreth
*Assistant Examiner*—Nicole Verley
(74) *Attorney, Agent, or Firm*—WPAT., P.C.; Justin King

(57) ABSTRACT

A structure for enabling independently suspended wheels to lean with vehicle hull, which comprises a linkage mechanism and two suspending mechanisms. The linkage mechanism comprises: a connecting part and a four-bar linkage structure composed of a ground rod, a floating rod, placed over the ground rod and parallel thereto, and two rocking arms; wherein an end of the floating rod is pivotally connected to an end of one rocking arm while another end of the floating rod is pivotally connected to an end of another rocking arm; and an end of the ground rod is pivotally connected to an end of one rocking arms opposite to that connected to the floating rod while another end of the ground rod is pivotally connected to an end of another rocking arm opposite to that connected to the floating rod; and the connecting part has a bulging sliding block matched and inset into a straight sliding slot arranged near center of the floating rod while the bottom of the connecting part is pivotally connected to a specific position of the ground rod near the center thereof. The suspending mechanism comprises: a hub, two suspending rods and a shock absorber; wherein the hub is pivotally connected to the rocking arm by the two suspending rods, and the top of the shock absorber is pivotally connected to the top of one rocking arm while the bottom of the shock absorber is pivotally connected to the bottom of the hub.

23 Claims, 8 Drawing Sheets

U.S. PATENT DOCUMENTS

| | | | | |
|---|---|---|---|---|
| 4,546,997 A | * | 10/1985 | Smyers | 280/5.509 |
| 4,550,926 A | * | 11/1985 | MacIsaac | 280/5.509 |
| 4,659,106 A | * | 4/1987 | Fujita et al. | 280/124.103 |
| 4,683,970 A | * | 8/1987 | Smith | 180/15 |
| 4,854,603 A | | 8/1989 | Scaduto | |
| 4,887,829 A | | 12/1989 | Prince | 280/282 |
| 4,998,596 A | | 3/1991 | Miksitz | 180/213 |
| 5,762,351 A | * | 6/1998 | SooHoo | 280/267 |
| 2004/0100059 A1 | | 5/2004 | VanDenBrink et al. | 280/124.103 |

FOREIGN PATENT DOCUMENTS

| | | |
|---|---|---|
| DE | 19533669 | 3/1997 |
| DE | 29615913 | 2/1998 |
| DE | 19838328 | 12/1999 |
| EP | 0900713 | 3/1999 |
| EP | 0983883 | 3/2000 |
| FR | 2858963 | 9/2003 |
| GB | 2279047 | 12/1994 |
| WO | WO 97/21583 | 6/1997 |
| WO | 2005058680 | 6/2005 |

* cited by examiner

STRUCTURE FOR ENABLING INDEPENDENTLY SUSPENDED WHEELS TO LEAN WITH VEHICLE HULL

FIELD OF THE INVENTION

The present invention relates to a structure for enabling independently suspended wheels to lean with a vehicle hull, and more particularly, to a vehicle having an independent-suspended wheel system and a six-bar linkage mechanism with sliding pair to be tilted with/by the vehicle hull, capable of enabling the vehicle to maintain a certain comfort, and possess good tracking ability and driving safety, which is featuring in that: the vehicle hull and the wheels is enabled to incline inwardly simultaneously while negotiating a curve or cornering for providing the vehicle a higher static safety factor (SSF) and thus improving the stability of the vehicle, moreover, the outside wheel is enabled to provide an additional inward force to the vehicle by enabling the outside wheel to incline inwardly more than the inside wheel while negotiating a curve or cornering so as to improving the tracking ability of the wheels and thus enhancing steering safety.

BACKGROUND OF THE INVENTION

To solve a problem that a vehicle with a relatively narrow track or a relatively high center of gravity is easy to overturn while negotiating a curve or cornering, and to solve a problem that an athletic vehicle is easy to slip or turn over while negotiating a curve at high speed, there are already many technical solutions available. One of which is disclosed in PCT Patent No. WO9721583, entitled "VEHICLE WITH AT LEAST THREE WHEELS AND A SUSPENSION SYSTEM", as seen in FIG. 1. In FIG. 1, a parallel linkage mechanism comprising four rocking arms 10 and two supporting members 8 is arranged for connecting the frame 1 to the wheels 11, while a plurality of damping members 14 (two of them shown in the figure) are used to connect the parallel linkage mechanism to the supports 16 and thus to the frame 1, such that the wheels 11 are brought to incline along with the inclined frame 1 as the inclined frame 1 drives the support members 8 to pull the rocking arms 10.

Another such technical solution is disclosed in U.S. Pat. No. 4,998,596, entitled "SELF-PROPELLED BALANCING THREE-WHEELED VEHICLE", as shown in FIG. 2. In FIG. 2, a parallelogram-type balancing linkage, which connects the rear frame assembly 18 to the rear wheels 14, 16, includes left and right end members 46, 48 and upper and lower cross members 50, 52, while the assembly of the parallelogram-type balancing linkage and the real wheels 14, 16 carried thereby is mechanically connected to the rear frame assembly 18 by a shock absorber (not shown in the figure) which permit relative vertical movement between the two, such that the two wheels 14, 16 are enabled to incline with the frame 18.

Furthermore, another such technical solution is disclosed in U.S. Pat. No. 4,887,829, entitled "REAR WHEEL SUSPENSIION SYSTEM FOR A TRICYCLE VEHICLE", as shown in FIG. 3. FIG. 3 shows the left rear wheel 16 rotatably mounted to left swing arm 17. Left swing arm 17 is pivotably mounted to the frame 10. The left swing arm 17 is pivotably mounted to shock absorber 18 through ball joint 19. Shock absorber 18 is pivotably mounted to rocking arm 20 through ball joint 21. Rocking arm 20 is pivotably mounted to the frame 10 at roll joint 22. Rocking arm 20 is pivotably connected to shock absorber 23 through ball joint 24. Shock absorber 23 is pivotably mounted to right side swing arm 25 through ball joint 26. Swing arm 25 is pivotably mounted to frame 10. The right rear wheel 27 is rotatably mounted to right swing arm 25. Thereby, the wheels 19, 27 are enabled to incline with the frame 10.

Yet, another such technical solution is disclosed in published U.S. patent application Ser. No. US20040100059, entitled "A TILTING VEHICLE PROVIDED WITH STEERABLE REAR WHEELS", as shown in FIG. 4. FIG. 4 shows a preferred embodiment with independently suspended rear wheels 14, 15, each of which is suspended such that it can turn about its own rear wheel steering axis 19, 20. The rear wheels 14, 15 are each suspended via an individual shock absorber 22, 23 on a supporting member 40 of the rear frame section. The rear wheels 14, 15 are each provided with a steering arm 24, which steering arms 24 are connected via a track rod 25, 26 to the end of a crank arm 27. The track rods 25, 26 are connected via respective ball joints 28 to the end of the respective steering arm 24. The crank arm 27 is rigidly connected to the front frame section 2 and is rotated about the longitudinal axis 8 on tilting of the front frame section 2. As a result the ends of the steering arms 24 are moved and turning of the rear wheels 14, 15 about the rear wheel steering axes 19, 20 takes place, which rear wheel steering axes run through the upper mounting point of the shock absorbers 22, 23 and the ball joint 28.

It is noted that the main objects of the aforesaid patents are to provide a structure enabling the vehicle frame to have an effect of shock absorption and enabling wheels of the vehicle to incline with the vehicle frame. However, the above patents have the following shortcomings:

1. As to the patents shown in FIGS. 1-3, the inclination angles of the wheels are same as that of the vehicle frame, by which the outside wheel is unable to provide additional centripetal force to increase drivability of the vehicle.
2. As to the patents shown in FIGS. 1-3, there is no toe angle control when the wheels incline with the vehicle frame.
3. As to the patent shown in FIG. 2, only one set of shock absorber is disposed. and connected to the rear frame 18, therefore, the shock absorption ability of the vehicle is poor since the vibration of the two wheels 14, 16 can not be absorbed respectively and independently.
4. As to the patent shown in FIG. 3, the suspension mechanism is a complicated spatial mechanism having moving parts being configured in wide range, and moreover, the swing arms 17, 25 can cause driving slide difference to occur between the two wheels 16, 27.
5. As to the patent shown in FIG. 4, in order to enable the two rear wheels to turn slightly, an additional complicated and fragile wheel steering mechanism is required.

SUMMARY OF THE INVENTION

In view of the disadvantages of prior art, the primary object of the present invention is to provide a structure for enabling independently suspended wheels to lean with a vehicle hull, capable of enabling the vehicle to maintain a certain comfort, and possess good tracking ability and driving safety, which is featuring in that: the vehicle hull and the wheels is enabled to incline inwardly simultaneously while negotiating a curve for providing the vehicle a higher static safety factor (SSF) and thus improving the stability of the vehicle, moreover, the outside wheel is enabled to provide an additional inward force to the vehicle hull by enabling the outside wheel to incline inwardly more than the inside wheel while negotiating a curve so as to improving the tracking ability of the wheels and thus enhancing steering safety To achieve the above object, the present invention provides a structure for enabling independently suspended wheels to lean with a vehicle hull, which comprises:

a linkage mechanism, further comprising:
a four-bar linkage structure, composed of a ground rod, a floating rod, being placed over the ground rod and parallel thereto, and two rocking arms; and
a connecting part, arranged at a position in the vicinity of the center between the floating rod and the ground rod while being oriented perpendicular to the two, having a bulging sliding block matched and inset to a straight sliding slot defined in the floating rod while the bottom end of the connecting part is pivotally connected to a specific position of the ground rod;

wherein an ends of the floating rod is pivotally connected to an end of one of the two rocking arm while another end of the floating rod is pivotally connected to an end of another rocking arm; and an ends of the ground rod is pivotally connected to an end of one of the two rocking arms opposite to that connected to the floating rod while another end of the ground rod is pivotally connected to an end of another rocking arm opposite to that connected to the floating rod;
and two suspending mechanism, each further comprising:
a hub, at least two suspending rods and a shock absorber;
wherein the hub is pivotally connected to one rocking arm corresponding thereto by the suspending rods, and the top of the shock absorber is pivotally connected to the top of the corresponding rocking arm while the bottom of the shock absorber is pivotally connected to a location selected from the grouping selected from: the bottom of the hub, and one of the suspending rod.

Preferably, the ground rod is longer than the floating rod.

Preferably, the sliding block may be in a shape of column, which is integrally formed with the connecting part or may be screw-fixed to the connecting part by a bolt.

Preferably, the sliding block is slidably engaged with the sliding slot.

Preferably, the equivalent plane of the four-bar linkage structure is enabled to lean toward the center of gravity of the vehicle hull while maintaining an included angle formed between itself and the ground to be less than 90 degrees.

Preferably, the connecting part is rigidly connected with the vehicle hull.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
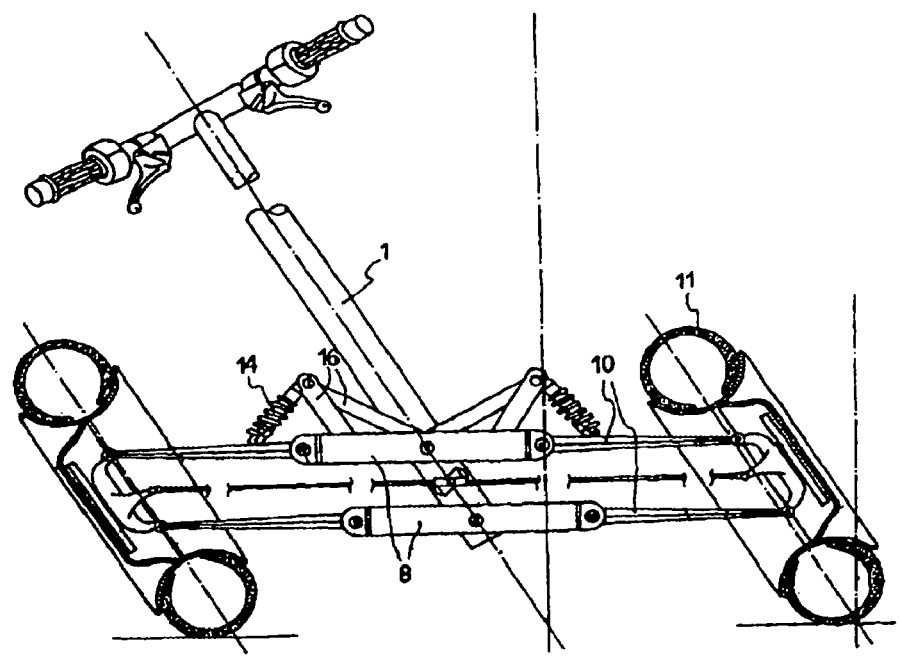
FIG. 1 is a schematic view of a conventional vehicle hull disclosed in PCT Patent No. WO9721583.
Figure 2:
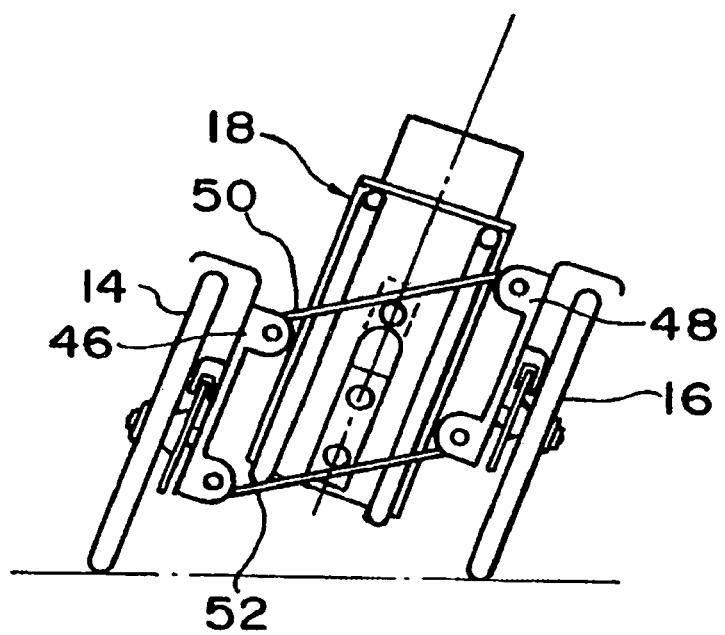
FIG. 2 is a schematic view of a conventional vehicle hull disclosed in U.S. Pat. No. 4,998,596.
Figure 3:
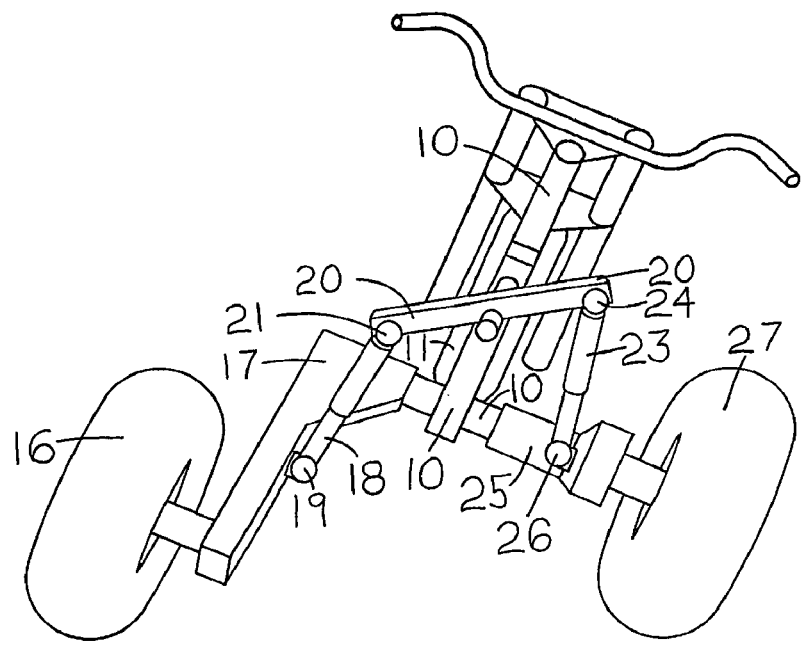
FIG. 3 is a schematic view of a conventional vehicle hull disclosed in U.S. Pat. No. 4,887,829.
Figure 4:
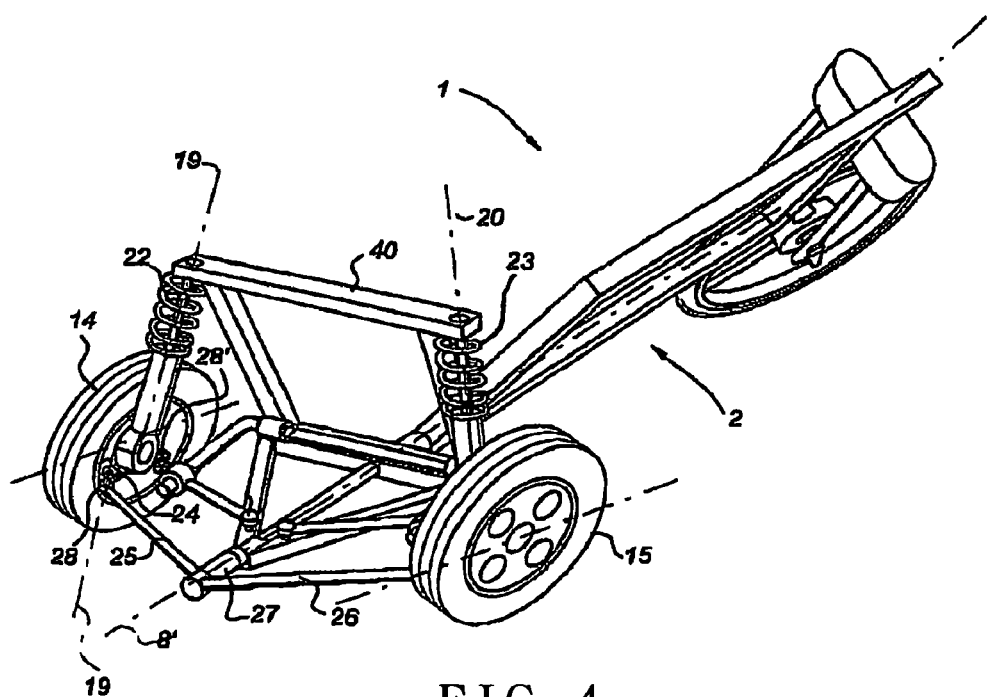
FIG. 4 is a schematic view of a conventional vehicle hull disclosed in U.S. Publish. No. 20040100059.
Figure 5:
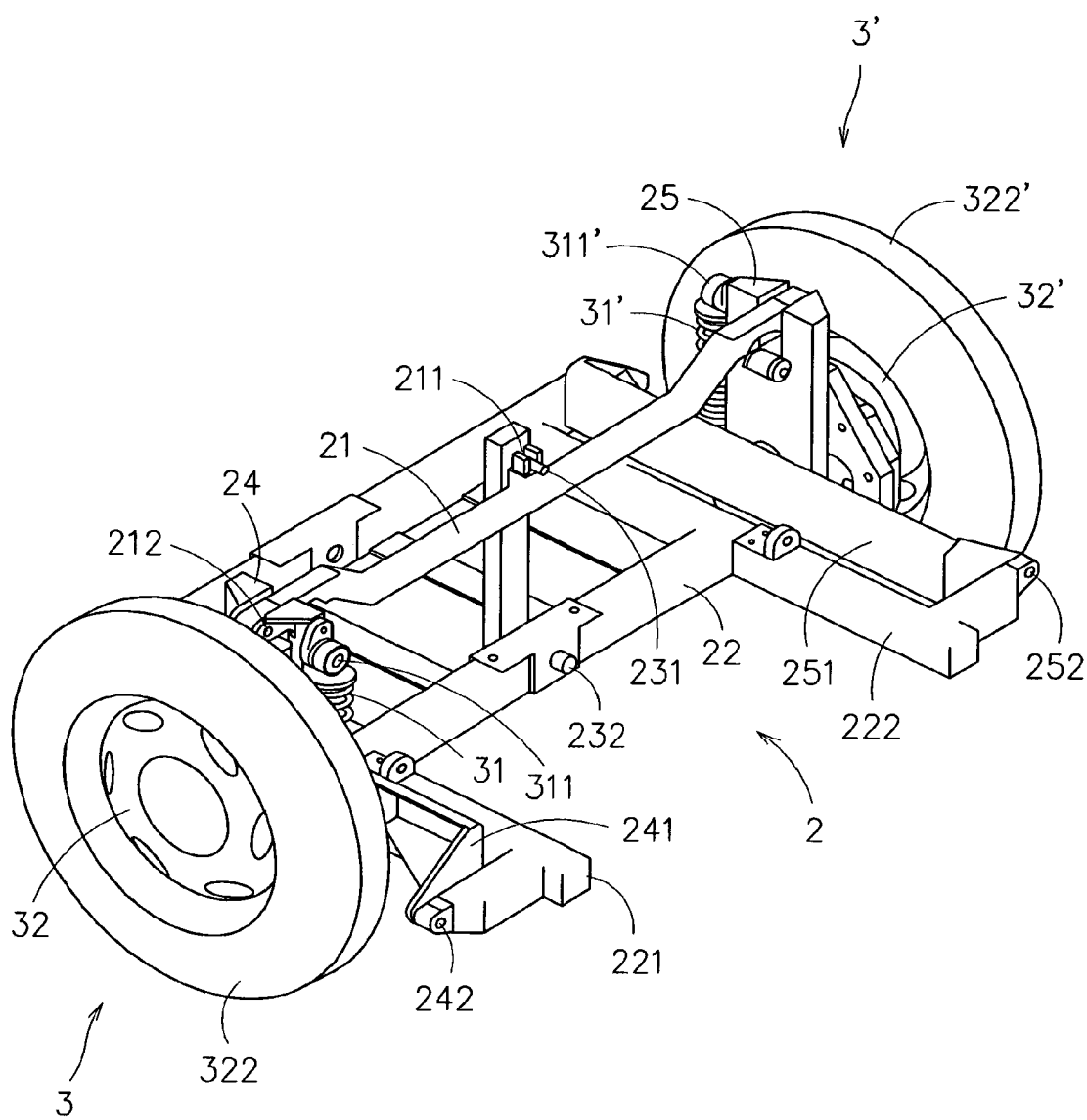
FIG. 5 is a perspective view of a structure for enabling independently suspended wheels to lean with a vehicle hull in accordance with a preferred embodiment of the present invention.
Figure 6:
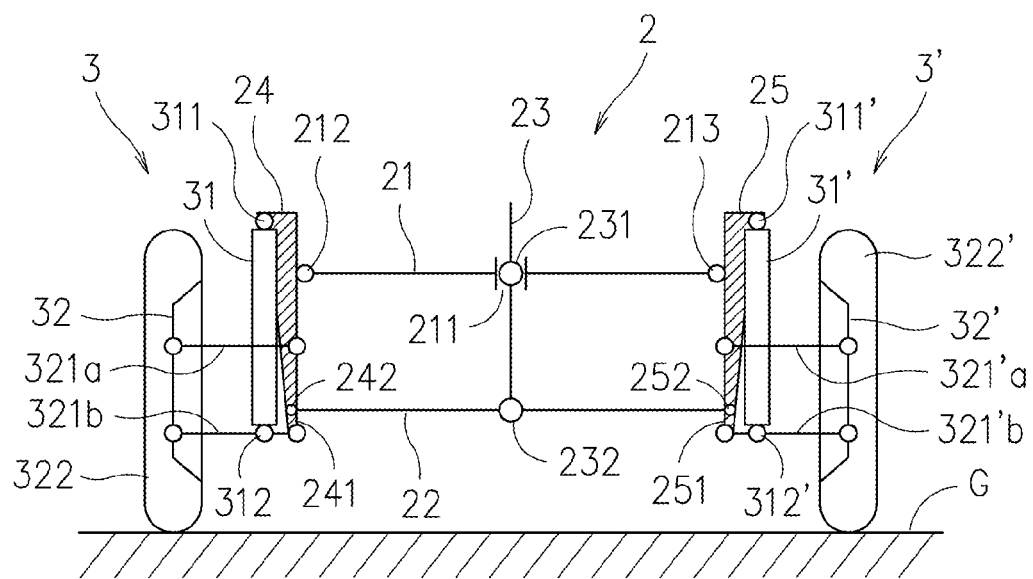
FIG. 6 is a rear view of FIG. 5.

Please refer to FIGS. 5 and 6, which are respectively a perspective view and a rear view of a structure for enabling independently suspended wheels to lean with a vehicle hull in accordance with a preferred embodiment of the present invention. The structure is comprised of a linkage mechanism 2 and two suspending mechanisms 3, 3'. The linkage mechanism 2 further comprises a floating rod 21, a ground rod 22 located under and longer than the floating rod 21, and a connecting part 23. The connecting part 23 is rigidly connected with a vehicle hull (not shown) and has a bulging sliding block 231. The sliding block 231 may be integrally formed with the connecting part 23 and is in a shape of column. The sliding block 231 may also be screw-fixed to the connecting part 23 by a bolt. The sliding block 231 is embedded in a straight sliding slot 211 defined in the floating rod 21. The slidable engagement between the sliding block 231 and the sliding slot 211 enables the connecting part 23 to connect with the floating rod 21. The bottom of the connecting part 23 is pivotally connected with the ground rod 22 by a pivot 232. The configuration of the pivot 232 enables the connecting part 23 and the ground rod 22 to form a connecting relationship. The two ends of the floating rod 21 are respectively pivotally connected to the tops of the two rocking arms 24, 25 through pivots 212, 213. The Bottom of the rocking arms 24, 25 are respectively fixed with seat 241, 251, which are respectively orientated perpendicularly to the rocking arms 24, 25. The ends of the seat 241, 251 are respectively pivotally connected to the two clipping seats 221, 222 (not labeled in FIG. 6) disposed at opposite ends of the ground rod 22 by pivots 242, 252. The suspending mechanisms 3, 3' mainly are composed of shock absorbers 31, 31' and hubs 32, 32' in respective. The hubs 32 is pivotally connected with the rocking arms 24 through at least one pair of suspending rods 321a, 321b while the hubs 32' is pivotally connected with the rocking arms 25 through at least one pair of suspending rods 321a', 321b'. Wheels 322, 322' are worn outside the hubs 32, 32'. The shock absorbers 31, 31' are respectively pivotally connected with the tops of the rocking arms 24, 25 by pivots 311, 311'. The shock absorbers 31, 31' are pivotally connected with the suspending rods 321b, 321b' at the bottom thereof by pivots 312, 312'.

Figure 7:
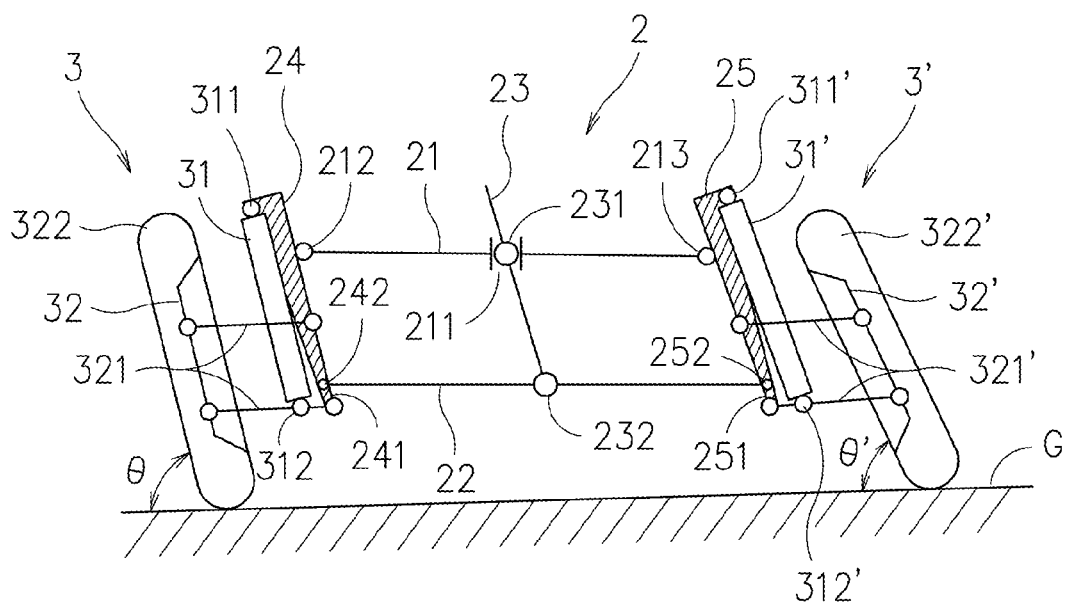
FIG. 7 is a schematic view showing the structure of FIG. 5 being at an inclining status.

Please refer to FIG. 7, which is a schematic view showing the structure of FIG. 5 being at an inclining status. As seen in FIG. 7, since the connecting part 23 is rigidly connecting with the vehicle hull (not shown), the inclination of the vehicle hull will bring along the connecting part 23 to lean therewith as the vehicle hull is inclining negotiating a curve. As soon as the connecting part 23 is brought to incline, the floating rod 21 and the ground rod 22 are driven thereby to skew that will cause the two rocking arms 24, 25 connecting thereto to incline accordingly and eventually the hubs 32, 32' is going to incline with the inclined rocking arms 24, 25 since the hubs 32, 32' are pivotally connected with the rocking arms 24, 25 through the connecting rods 321, 321'. Two independently suspended shock absorbers 31, 31' are respectively provided to the hubs 32, 32' for providing shock absorption to the wheels 322, 322' and thus enabling the two to maintain good tracking and traction. It must be emphasized that the linkage mechanism 2 of the present invention is different from the conventional parallelogram-type linkage mechanism. The feature of the present invention is the sliding pair of the sliding block 231 and the sliding slot 211. It is noted that as the inclination of the connecting part 23 brings the floating rod 21, the ground rod 22 and the rocking arms 24, 25 to move along therewith, the sliding block 231 is driven to move up and down the sliding slot 211. Thus, the linkage mechanism 2 of the present invention can be referred as a six-bar linkage mechanism with sliding pair, which is composed of the floating rod 21, the ground rod 22, the connecting part 23, the rocking arms 24, 25 and the bulging sliding block 231. By configuring the floating rod 21 to be shorter than the ground rod. 22 and insetting the sliding block 231 into the sliding slot, the rocking arms 24, 25 to enabled to incline with different inclination angles, whereby the two hubs 32, 32' (i.e. the wheels 322, 322') connecting to the rocking arms 24, 25 enabled to incline with different inclination angles, referred respectively as θ, θ'.

Figure 8:
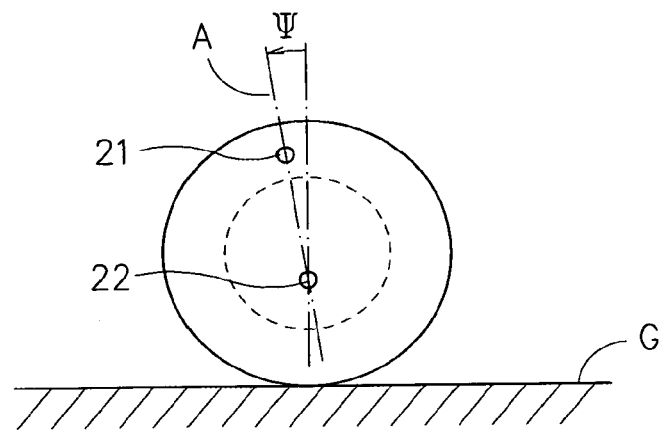
FIG. 8 is a schematic view showing a forward inclining equivalent plane of the present invention.
Figure 9:
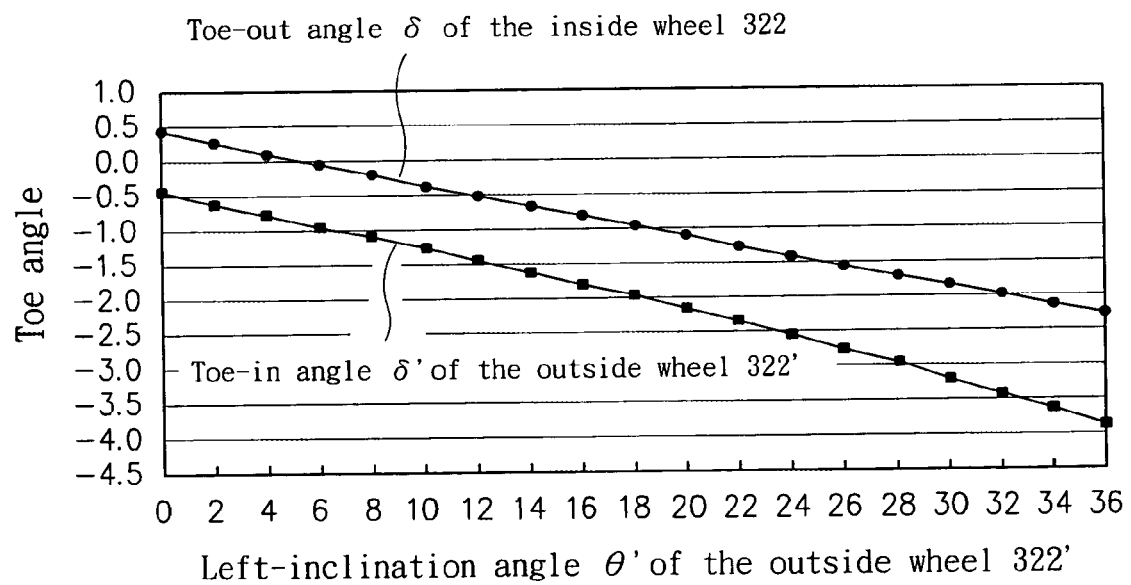
FIG. 9 is a graph of toe analysis of the present invention.
Figure 8C:
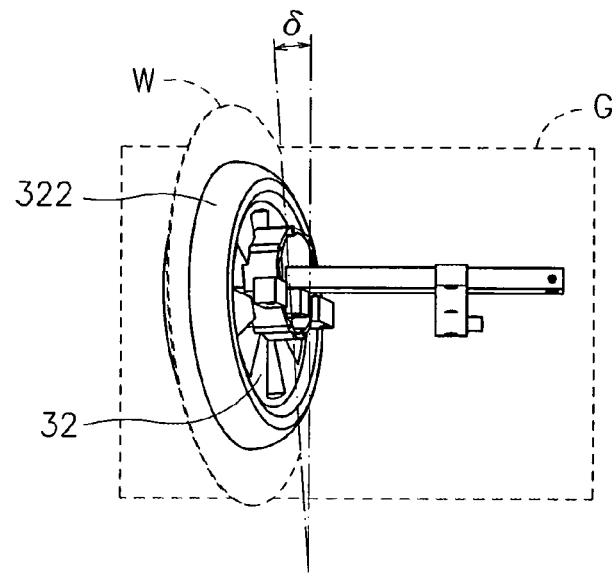
FIGS. 8A-8C are respectively a side view, a front view and a top view of a wheel leaning with the vehicle hull according to the present invention.
Figures 8A, 8B:
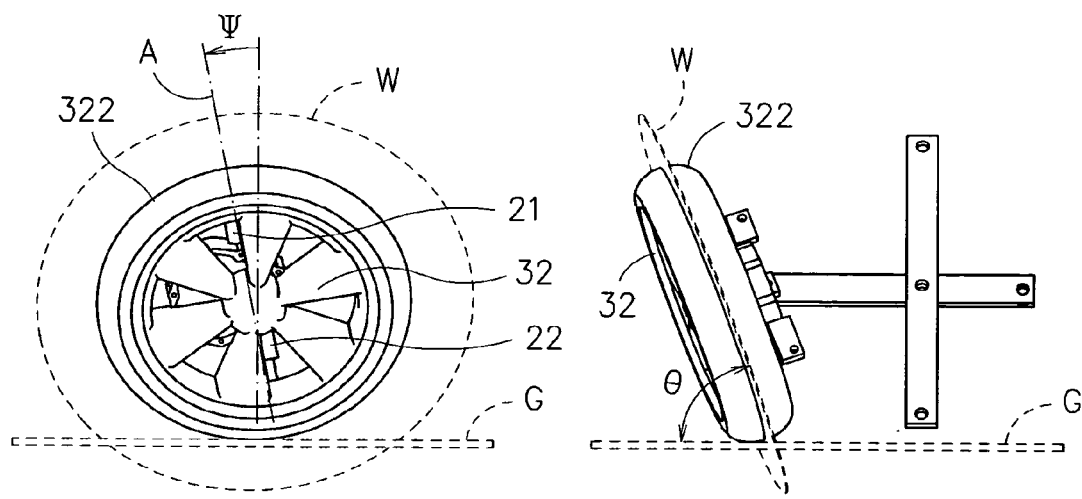

Furthermore, as seen in FIGS. 8 and 8A-8C, in addition to the characteristic that the length of the floating rod 21 is different from that of the ground rod 22, the equivalent plane defined by the floating rod 21 and the ground rod 22 is forward inclined. As shown in FIG. 8, since the horizontal position of the floating rod 21 is located slightly ahead of the ground rod 22, the equivalent plane A defined by the floating rod 21 and the ground rod 22 is forward inclined by angle Ψ (that is, the included angle defined between the plane A and the ground G is less than 90 degrees). Thus, as the wheel 322 shown in FIGS. 8A-8C, since the wheel 322 is pivotally connected to the rocking arm 24, which is further pivotally connected to the floating rod 21 and the ground rod 22, the radial central plane W of the wheel 322 and the ground G form an inclining angle θ when the wheel is inclined with the vehicle hull. In conjunction with the above described six-bar linkage mechanism with sliding pair composed of the floating rod 21, the ground rod 22, the connecting part 23, the rocking arms 24, 25 and the bulging sliding block 231, or any parallelogram-type linkage mechanism capable of enabling the wheel to lean with the vehicle hull, the outside wheel and the inside wheel both are going to turn toward the same side as the vehicle hull is inclining while negotiating a curve. As the inclined vehicle shown in FIG. 7, the left-inclined connecting part 23 represents that the vehicle hull is subject to a left turning status, so that the wheel 322 is referred as the inside wheel and the wheel 322' is referred as the outside wheel. As shown in the analysis graph of FIG. 9, when the inside and outside wheels 322, 322' simultaneously turn left, the toe angle defined by the inside wheel 322 is referred as toe-out δ, and the toe angle defined by the outside wheel 322' is referred as toe-in δ'. Furthermore, the larger the vehicle is to incline, the variation of the toe-out δ' of the outside wheel 322' is larger than that of the toe-out δ the inside wheel 322 by about 1.5°~2°. Thereby, the two wheels 322, 322' provide more lateral inward thrust to increase steering during negotiating a curve.

Figure 10:
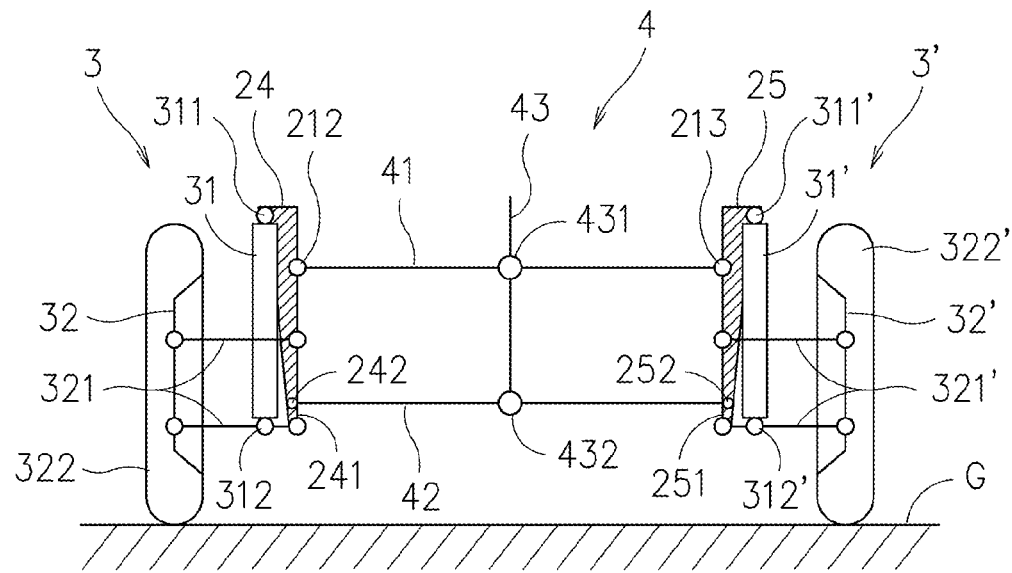
FIG. 10 is a rear view showing a suspending mechanism applying to a four-bar linkage structure according to the present invention.
Figure 11:
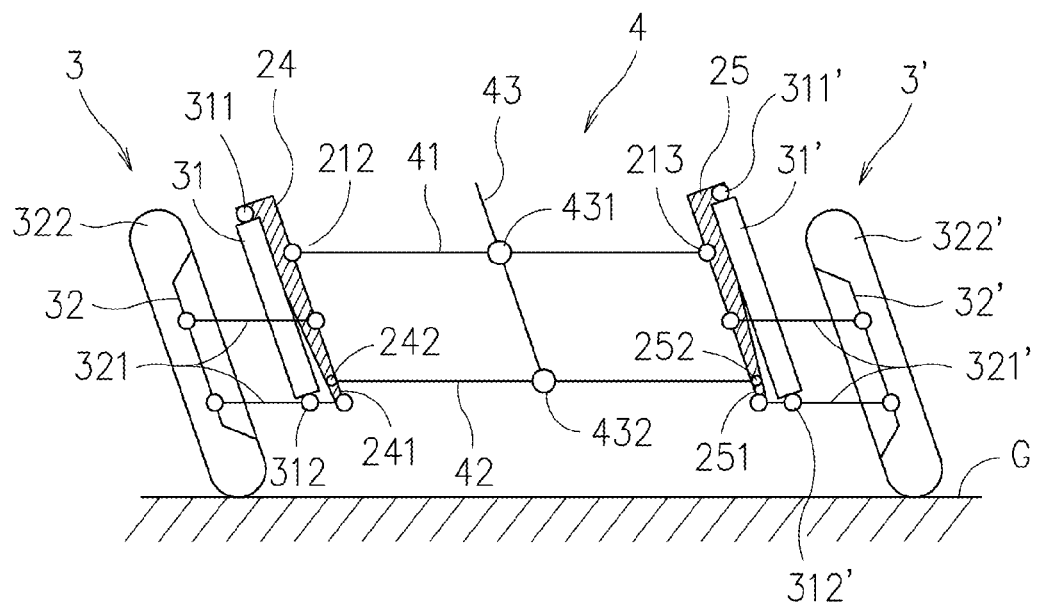
FIG. 11 is a schematic view showing the leaning structure of FIG. 10.

Further referring to FIGS. 10-11, the suspending mechanisms 3, 3' of the present invention may be applied to a conventional parallelogram-type linkage mechanism 4. The linkage mechanism 4 includes a top rod 41, a ground rod 42 below the top rod 41 and a connecting rod 43, rigidly connected with a vehicle hull (not shown). The top portion of the connecting rod 43 is pivotally connected with the top rod 41 by a pivot 431. The bottom portion of the connecting rod 43 is pivotally connected with the ground rod 42 by a pivot 432. The connection relationship of other members is similar to that shown in FIG. 6 and is not described herein. The embodiment of the present invention is to show that the suspending mechanism 3, 3' of the present invention can help to enable the wheels 322, 322' to maintain good tracking and traction while increase driving comfort and safety, and simultaneously facilitate the maintenance of the structure.

Figure 12:
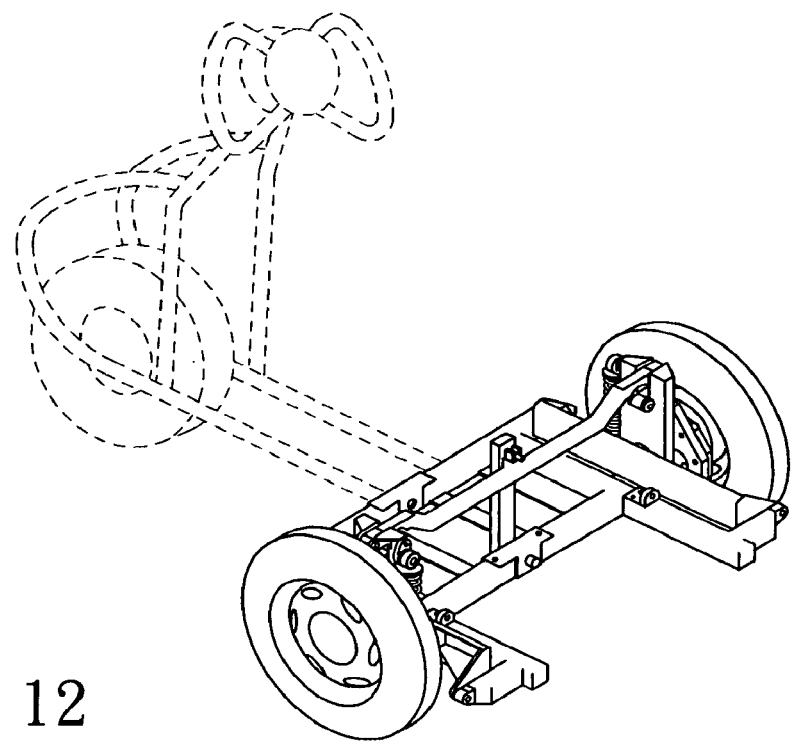
FIG. 12 is a perspective view showing the application of the structure of the present upon a tricycle.
Figure 13:
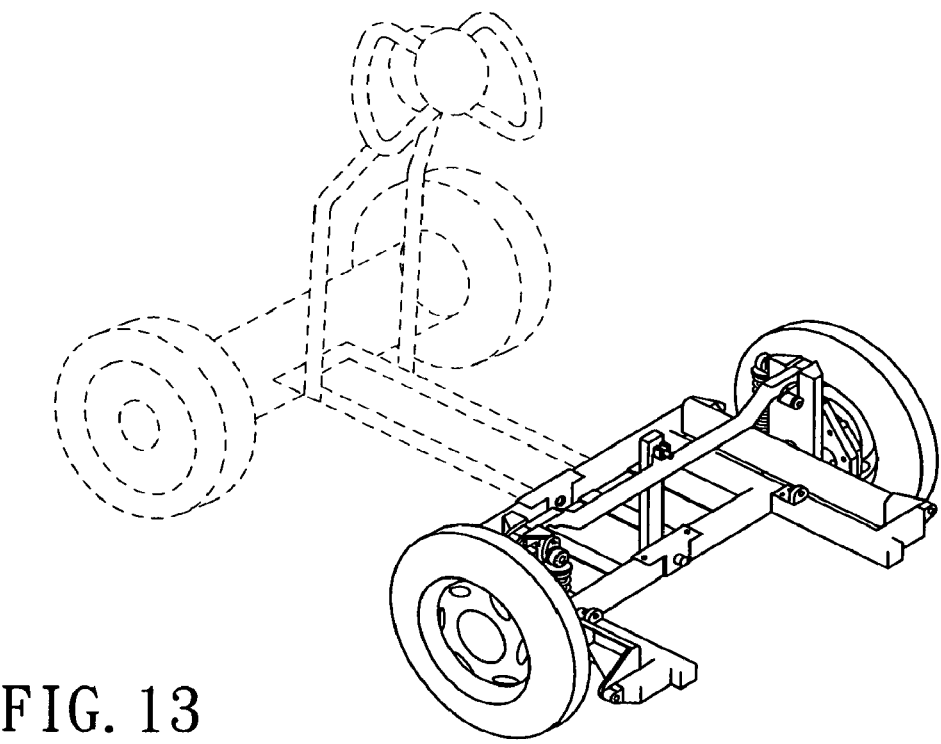
FIG. 13 is a perspective view showing the application of the structure of the present upon a four-wheeled vehicle.

Please refer to FIGS. 12 and 13, which are respectively is a perspective view showing the application of the structure of the present upon a tricycle and upon a four-wheel vehicle. The structure for enabling independently suspended wheels to lean with a vehicle hull of the present invention may be applied to a tricycle as shown in FIG. 12 or a rectangular quadricycle configured with two front wheels as shown in FIG. 13. In addition, the structure of the present invention may be applied to a rhombic quadricycle or other vehicles. As to the use scope, the present invention may be applied to a recreation vehicle, an all terrain vehicle, a racing car and so on to increase driving comfort and safety through the structure of the present invention.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A structure for enabling independently suspended wheels to lean with a vehicle hull, comprising:
   a linkage mechanism, further comprising:
      a four-bar linkage structure, composed of a ground rod, a floating rod, being placed over the ground rod and parallel thereto, and two rocking arms; and
      a connecting part, arranged at a position in the vicinity of the center between the floating rod and the ground rod while being oriented perpendicular to the two, having a bulging sliding block matched and inset to a straight sliding slot defined in the floating rod while the bottom end of the connecting part is pivotally connected to a specific position of the ground rod;
   wherein, an end of the floating rod is pivotally connected to an end of one of the two rocking arms while another end of the floating rod is pivotally connected to an end of another rocking arm; and an end of the ground rod is pivotally connected to an end of one of the two rocking arms opposite to that connected to the floating rod while another end of the ground rod is pivotally connected to an end of another rocking arm opposite to that connected to the floating rod; and two suspending mechanism, each further comprising:
a hub, at least two suspending rods and a shock absorber;
wherein, the hub is pivotally connected to one rocking arm corresponding thereto by the suspending rods, and the top of the shock absorber is pivotally connected to the top of the corresponding rocking arm while the bottom of the shock absorber is pivotally connected to the bottom of the hub.

2. The structure of claim 1, wherein the sliding block is integrally formed with the connecting part.

3. The structure of claim 1, wherein the sliding block is screw-fixed to the connecting part by a bolt.

4. The structure of claim 1, wherein the sliding block is slidably engaged with the sliding slot.

5. The structure of claim 1, wherein an included angle formed between an equivalent plane of the four-bar linkage structure and the ground is less than 90 degrees.

6. The structure of claim 1, wherein the connecting part is rigidly connected with the vehicle hull.

7. The structure of claim 1, wherein the bottom portion of the shock absorber is pivotally connected to a location of the suspending rod pivotally connected to the corresponding rocking arm.

8. The structure of claim 1, wherein the ground rod is longer than the floating rod.

9. The structure of claim 1, wherein the bottom portion of the shock absorber is pivotally connected to the suspending rod disposed at the vicinity of bottom part of the hub.

10. A structure for enabling independently suspended wheels to lean with a vehicle hull, comprising:
a linkage mechanism, further comprising:
a four-bar linkage structure, composed of a ground rod, a floating rod, being placed over the ground rod and parallel thereto, and two rocking arms; and
a connecting part, arranged at a position in the vicinity of the center between the floating rod and the ground rod while being oriented perpendicular to the two, having a bulging sliding block matched and inset to a straight sliding slot defined in the floating rod while the bottom end of the connecting part is pivotally connected to a specific position of the ground rod;
wherein, an end of the floating rod is pivotally connected to an end of one of the two rocking arms while another end of the floating rod is pivotally connected to an end of another rocking arm; and an end of the ground rod is pivotally connected to an end of one of the two rocking arms opposite to that connected to the floating rod while another end of the ground rod is pivotally connected to an end of another rocking arm opposite to that connected to the floating rod.

11. The structure of claim 10, wherein the sliding block is integrally formed with the connecting part.

12. The structure of claim 10, wherein the sliding block is screw-fixed to the connecting part by a bolt.

13. The structure of claim 10, wherein the sliding block is slidably engaged with the sliding slot.

14. The structure of claim 10, wherein an included angle formed between an equivalent plane of the four-bar linkage structure and the ground is less than 90 degrees.

15. The structure of claim 10, wherein the connecting part is rigidly connected with the vehicle hull.

16. The structure of claim 10, wherein the ground rod is longer than the floating rod.

17. A structure for enabling independently suspended wheels to lean with a vehicle hull, comprising:
a linkage mechanism, further comprising:
a floating rod;
a ground rod, disposed under the floating rod and parallel thereto, and the ground rod is longer than the floating rod;
two rocking arms; and
a connecting part, arranged at a position in the vicinity of the center between the floating rod and the ground rod while being oriented perpendicular to the two, having a bulging sliding block matched and inset to a straight sliding slot defined in the floating rod while the bottom end of the connecting part is pivotally connected to a specific position of the ground rod;
wherein, an end of the floating rod is pivotally connected to an end of one of the two rocking arms while another end of the floating rod is pivotally connected to an end of another rocking arm; and an end of the ground rod is pivotally connected to an end of one of the two rocking arms opposite to that connected to the floating rod while another end of the ground rod is pivotally connected to an end of another rocking arm opposite to that connected to the floating rod, and an included angle formed between the ground and an plane, defined by the floating rod and the ground rod, is less than 90 degrees.

18. The structure of claim 17, wherein the sliding block is integrally formed with the connecting part.

19. The structure of claim 17, wherein the sliding block is screw-fixedly to the connecting part by a bolt.

20. The structure of claim 17, wherein the sliding block is slidably engaged with the sliding slot.

21. The structure of claim 17, wherein the connecting part is rigidly connected with the vehicle hull.

22. The structure of claim 17, further comprising two suspending mechanisms, each including:
a hub, at least a pair of suspending rods and a shock absorber;
wherein, the hub is pivotally connected to one rocking arm corresponding thereto by the suspending rods, and the top of the shock absorber is pivotally connected to the top of the corresponding rocking arm while the bottom of the shock absorber is pivotally connected to the bottom of the hub.

23. The structure of claim 22, wherein the bottom portion of the shock absorber is pivotally connected with the suspending rod disposed at the bottom of the hub.

* * * * *